(12) United States Patent
Roy et al.

(10) Patent No.: US 8,699,955 B2
(45) Date of Patent: Apr. 15, 2014

(54) METHOD AND APPARATUS TO TRANSMIT AND RECEIVE DATA IN A WIRELESS COMMUNICATION SYSTEM HAVING SMART ANTENNAS

(75) Inventors: Vincent Roy, Montreal (CA); Paul Marinier, Brossard (CA); Marian Rudolf, Montreal (CA); Joseph A. Kwak, Bolingbrook, IL (US)

(73) Assignee: InterDigital Technology Corporation, Wilmington, DE (US)

( * ) Notice: Subject to any disclaimer, the term of this patent is extended or adjusted under 35 U.S.C. 154(b) by 566 days.

(21) Appl. No.: 11/531,061

(22) Filed: Sep. 12, 2006

(65) Prior Publication Data
US 2007/0066299 A1 Mar. 22, 2007

Related U.S. Application Data

(60) Provisional application No. 60/717,673, filed on Sep. 16, 2005.

(51) Int. Cl.
*H04B 1/00* (2006.01)

(52) U.S. Cl.
USPC .......................... 455/63.4; 455/70; 455/562.1

(58) Field of Classification Search
USPC ......... 455/429, 12.1, 437, 561, 101, 73, 63.4, 455/70, 562.1; 370/473, 535, 445, 278, 329
See application file for complete search history.

(56) References Cited

U.S. PATENT DOCUMENTS

| 4,680,755 | A | | 7/1987 | Reames | |
|---|---|---|---|---|---|
| 5,095,535 | A | * | 3/1992 | Freeburg | 455/278.1 |
| 5,894,598 | A | * | 4/1999 | Shoki | 455/562.1 |
| 5,960,350 | A | * | 9/1999 | Schorman et al. | 455/450 |
| 6,208,858 | B1 | * | 3/2001 | Antonio et al. | 455/429 |
| 6,370,369 | B1 | * | 4/2002 | Kraiem et al. | 455/277.1 |
| 6,788,702 | B1 | | 9/2004 | Garcia-Luna-Aceves et al. | |
| 7,130,663 | B2 | * | 10/2006 | Guo | 455/562.1 |
| 2003/0169769 | A1 | * | 9/2003 | Ho et al. | 370/473 |
| 2003/0236096 | A1 | * | 12/2003 | Yamazaki | 455/456.6 |

(Continued)

FOREIGN PATENT DOCUMENTS

| EP | 1 392 073 | | 2/2004 |
|---|---|---|---|
| EP | 1 562 306 | | 8/2005 |
| JP | 11-055177 | | 2/1999 |
| JP | 2000114846 | A * | 4/2000 |

OTHER PUBLICATIONS 802.11e-2005 IEEE Standard for Information technology—Telecommunications and information exchange between systems—Local and metropolitan area networks—Specific requirements Part 11: Wireless LAN Medium Access Control (MAC) and Physical Layer (PHY) specifications Amend. 8: Medium Access Control (MAC) Quality of Service Enhancements, IEEE 2005.*

(Continued)

*Primary Examiner* — Gennadiy Tsvey
(74) *Attorney, Agent, or Firm* — Volpe and Koenig, P.C.

(57) ABSTRACT

In a wireless communication system having smart antennas and comprising a plurality of wireless transmit/receive units (WTRUs), a method and apparatus for transmitting and receiving data comprises a first WTRU transmitting a request for antenna (RFA) frame to a second WTRU. The second WTRU receives the RFA frame and determines a preferred antenna to receive a dataframe transmission. The first WTRU transmits the dataframe on the preferred antenna.

8 Claims, 5 Drawing Sheets

(56) References Cited

U.S. PATENT DOCUMENTS

| | | | | |
|---|---|---|---|---|
| 2004/0002363 | A1* | 1/2004 | Cuffaro | 455/562.1 |
| 2004/0038713 | A1* | 2/2004 | Okawa et al. | 455/561 |
| 2004/0100936 | A1* | 5/2004 | Liu et al. | 370/345 |
| 2004/0106436 | A1 | 6/2004 | Ochi et al. | |
| 2004/0120348 | A1* | 6/2004 | Chang et al. | 370/474 |
| 2004/0160930 | A1* | 8/2004 | Choi et al. | 370/338 |
| 2004/0196834 | A1* | 10/2004 | Ofek et al. | 370/352 |
| 2004/0214606 | A1* | 10/2004 | Wichman et al. | 455/562.1 |
| 2005/0089005 | A1 | 4/2005 | Sakoda et al. | |
| 2005/0176385 | A1 | 8/2005 | Stern-Berkowitz et al. | |
| 2005/0285803 | A1* | 12/2005 | Iacono et al. | 370/334 |
| 2006/0089141 | A1* | 4/2006 | Ho et al. | 455/436 |
| 2006/0164969 | A1* | 7/2006 | Malik et al. | 370/203 |
| 2006/0172711 | A1* | 8/2006 | King et al. | 455/101 |
| 2007/0213087 | A1* | 9/2007 | Laroia et al. | 455/522 |

OTHER PUBLICATIONS

"Frame" definition at Whatis.com retrieved from http://searchnetworking.techtarget.com/sDefinition/0,,sid7_gci212152,00.html.*

"Frame" definition at Whatis.com (retrieved from http://searchnetworking.techtarget.com/sDefinition/0,,sid7_gci212152,00.html.

IEEE, *IEEE Standard for Information technology—Telecommunications and information exchange between systems—Local and metropolitan area networks—Specific requirements Part 11: Wireless LAN Medium Access Control (MAC) and Physical Layer (PHY) specifications; Amendment 8: Medium Access Control (MAC) Quality of Service Enhancements*, IEEE 802.11e-2005 (2005).

IEEE, *IEEE P802.11v/D0.04 Draft Amendment To Standard For Information Technology—Telecommunications And Information Exchange Between Systems—LAN/MAN Specific Requirements—Part 11: Wireless Medium Access Control (MAC) And Physical Layer (PHY) Specifications, Amendment v: Wireless Network Management*, IEEE 802.11v/D0.04, (Jul. 2006).

"Frame" definition at Whatis.com (retrieved from http://searchnetworking.techtarget.com/sDeffinition/0,,sid7_gci212152,00.html.

* cited by examiner

METHOD AND APPARATUS TO TRANSMIT AND RECEIVE DATA IN A WIRELESS COMMUNICATION SYSTEM HAVING SMART ANTENNAS

CROSS REFERENCE TO RELATED APPLICATIONS

This application claims the benefit of U.S. Provisional Application No. 60/717,673, filed on Sep. 16, 2005, which is incorporated by reference herein as if fully set forth.

FIELD OF INVENTION

This invention relates to the transmission and reception of data in a wireless communication system. In particular, the present invention relates to a method and apparatus to transmit and receive data in a wireless communication system having smart antennas.

BACKGROUND

In an access point (AP)-based wireless local area network (WLAN), multiple stations (STAs) may be associated with a given AP at any given time. If the multiple-access scheme is Carrier Sense Multiple Access/Collision Avoidance (CSMA/CA) such as in 802.11 WLANs, any STA may transmit a data packet (also called "frame") to its associated AP at any given time. Typically, the AP determines which of its associated STAs has transmitted a packet after the packet has been completely received and decoded, based on the source address contained in the medium access control (MAC) header of the packet. In order to make this determination, the AP generally needs to have received the whole packet, because the error detection bits covering both the MAC header and the MAC payload are usually received at the end of the packet transmission.

An AP may also be equipped with a smart antenna in order to improve the signal-to-noise ratio (and hence the throughput and/or coverage) of AP-to-STA transmissions as well as STA-to-AP transmissions. The term "smart antenna" in this context may refer to a set of N antennas that have different radiation patterns, such as by pointing in different directions, or a smart antenna may include an omni-directional antenna, which is capable of transmitting beams in a plurality of separate directions.

Ordinarily, the transmitter or receiver of a node (AP or STA) selects the most appropriate antenna, or beam, for communicating with its counterpart. The most appropriate beam is typically the one that results in the highest signal-to-noise-plus-interference ratio (SINR) at the receiving node in the case of dedicated connections, where a node is transmitting a data packet to another specific node.

Additionally, Mesh Points (MPs), which are similar to STAs in a mesh architecture, may also be equipped with smart antennas in order to improve the signal-to-noise ratio of received signals or for other purposes such as interference reduction.

In the case where more than one STA is associated with an AP, the multiple-access scheme in 802.11 may render difficult the selection of the most appropriate beam for the reception of packets at the AP. This is because STAs may be located in any direction relative to the AP. As a result, the most appropriate beam may not be the same for different STAs. Since the identity of the STA is not known before completion of the reception of the packet, the AP cannot use this information to decide which antenna or beam to select for the reception of the packet. The same problem exists for MPs in a mesh architecture when an MP can be linked to more than one other MP.

To address this difficulty, several alternatives may be employed. However, there are drawbacks to each alternative. For example, the AP could restrict itself to the use of an omni-directional beam for all packet receptions, but it would then lose the potential gain from the use of a smart antenna.

Alternatively, the AP could use the signals from multiple beams simultaneously and combine them or select the best among them. The drawback to this solution, however, is that it increases the complexity of the receiver, because the signal from multiple beams must be demodulated.

In another alternative, the AP could, just after the start of packet reception, switch among all its available beams in a successive manner, pick the beam that resulted in the best signal quality, and switch to this beam for the remaining duration of the packet reception. This approach has the drawback that the AP risks incorrectly receiving some bits while it is cycling through the least suitable beams for a particular packet, resulting in the loss of the packet.

Another alternative is that the AP could try decoding the medium access control (MAC) address of the sender (contained in the MAC header of the packet) using an omni-directional antenna, and then use the most appropriate beam for the particular STA identified in this way for the remaining of the packet. The problem with this approach is that the MAC header is transmitted at the same rate as the remaining portion of the packet. If the omni-directional antenna does not offer sufficient gain for adequate signal quality for the MAC payload, it is unlikely that the MAC header would be decoded correctly. In the opposite case, there would be no need for the use of a smart antenna in the first place.

In yet another alternative, the STAs could be constrained to send every packet using Request-to-Send/Clear-to-Send (RTS/CTS) procedure. This would allow the AP to identify the sending STA before the arrival of the data packet. However, this is at the cost of a significant throughput penalty due to the overhead of the RTS and CTS packets, which has the effect of potentially nullifying the purpose of using smart antennas.

The AP could poll STAs using different beams in succession. However, it is inconvenient to attempt to predict the time to spend on each beam in a system with bursty traffic such as that in a wireless LAN, and it is also difficult to prevent STAs from responding to a poll sent using a beam that is sub-optimal, but recognizable, for them. This is due to the necessary overlap between antenna patterns and the irregularities of the radio environment, such as shadowing.

Another alternative could be to add an identifier to the Physical Layer Convergence Protocol (PLCP) header to allow the AP to determine which beam it should use for the reception of the MAC frame. This identifier could correspond to a beam identifier or to a station identifier. Although this solution may have the least overhead, it involves changes in the lower layers of the WLAN protocol, which may not be acceptable in some scenarios.

Another problem associated with some of the solutions above is that they rely on the assumption that if the AP is able to identify from which STA the frame originates, the AP will automatically know what beam it should use when receiving packets from this STA. This may only be true if the AP performed a beam scanning procedure prior to the transmission and reception of frames. In fact, even in the case where an AP has already performed such a beam scanning procedure, the AP might not be able to determine which beam will maximize the reception of packets from the desired STA since each STA can move and the RF environment may vary.

It should be noted that all of the above problems are present in a mesh network when an MP is equipped with smart antennas. Like an AP, an MP can receive packets from a multitude of WLAN nodes, such as neighboring MPs. Thus, in a mesh system using an access mechanism similar to the contention-based mode used in typical 802.11 systems, an MP equipped with smart antennas has no means for knowing which MP will send the next packet prior to the packet being sent. Accordingly, this is an obstacle to the use of the smart antenna capabilities of the MP when receiving packets.

It would therefore be desirable if a method and apparatus existed that overcomes the drawbacks of prior art wireless systems.

SUMMARY

In a wireless communication system having smart antennas and comprising a plurality of wireless transmit/receive units (WTRUs), a method and apparatus for transmitting and receiving data comprises a first WTRU transmitting a request for antenna (RFA) frame to a second WTRU. The second WTRU receives the RFA frame and determines a preferred antenna to receive a dataframe transmission. The first WTRU then transmits the dataframe on the preferred antenna.

BRIEF DESCRIPTION OF THE DRAWINGS

The foregoing summary, as well as the following detailed description of the preferred embodiments of the present invention will be better understood when read with reference to the appended drawings, wherein.

DETAILED DESCRIPTION OF THE PREFERRED EMBODIMENTS

Hereafter, the terminology "wireless transmit/receive unit" or "WTRU" includes, but is not limited to, a station (STA), user equipment (UE), mobile station, fixed or mobile subscriber unit, pager, access point (AP), base station, Node-B, site controller, mesh point (MP), or any other type of device capable of operating in a wireless environment.

Figure 1:
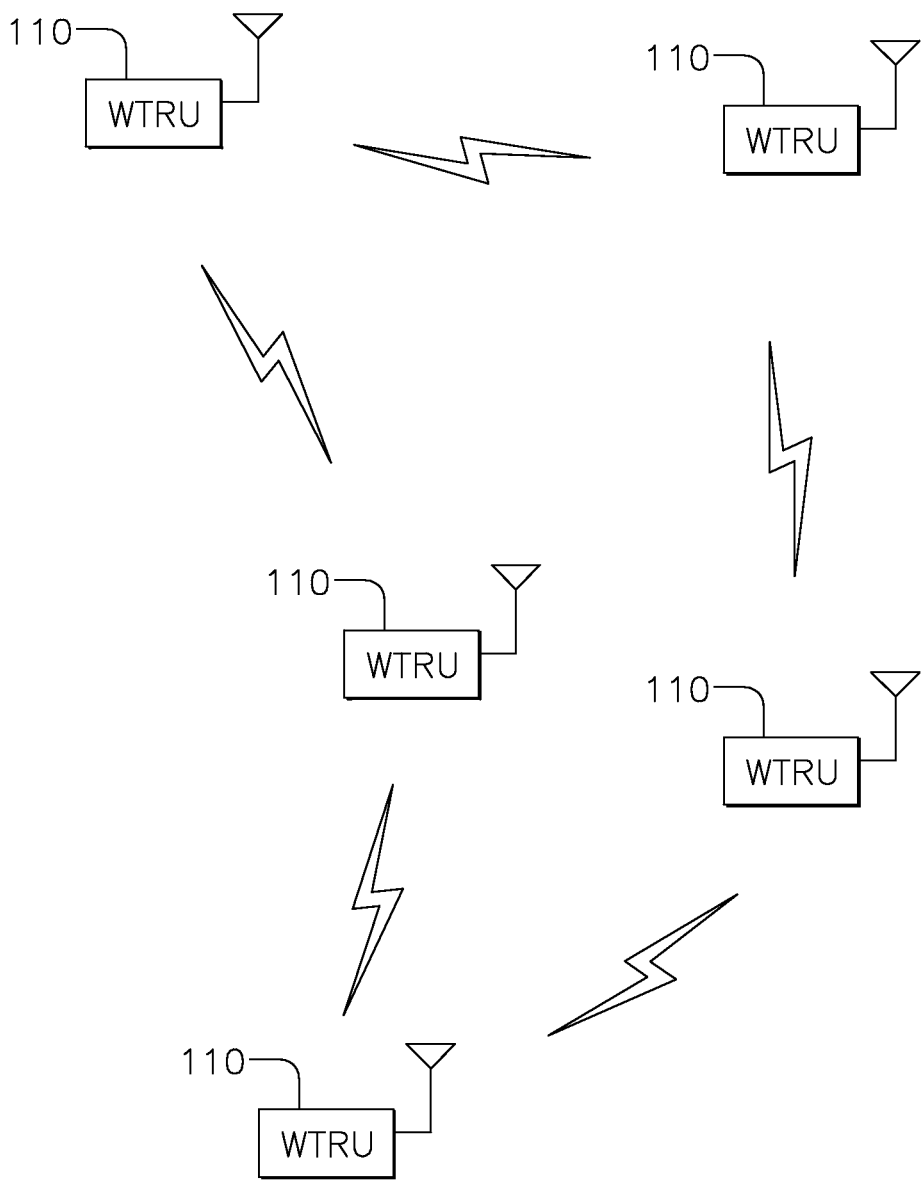
FIG. 1 shows a wireless communication system configured in accordance with the present invention.

FIG. 1 shows a wireless communication system 100 configured in accordance with the present invention. The wireless communication system 100 includes a plurality of WTRUs 110, capable of wireless communication with one another. The WTRUs 110 may be MPs, APs, STAs, or any combination thereof.

Figure 2:
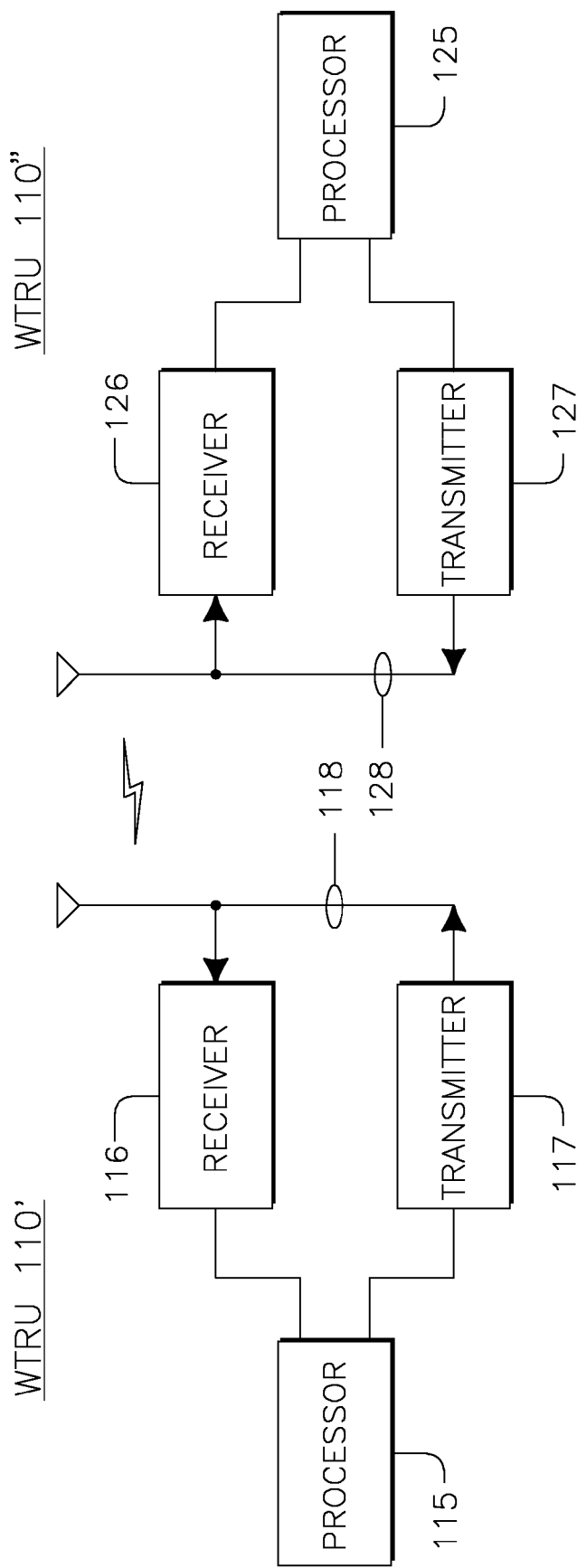
FIG. 2 shows a block diagram of a pair of WTRUs configured to perform a method for the transmission and reception of data using smart antennas in the wireless communication system of FIG. 1, in accordance with the present invention.

FIG. 2 shows a block diagram of a pair of WTRUs 110 (designated 110' and 110") configured to perform a method for the transmission and reception of data using smart antennas in the wireless communication system 100, in accordance with the present invention. For purposes of example, the WTRU 110' may be a STA WTRU, while the WTRU 110" may be an AP WTRU. Additionally, such as in a mesh network, both WTRUs 110 may be MPs.

In addition to the components in a typical WTRU, the WTRU 110' includes a processor 115 configured to transmit and receive data packets utilizing a smart antenna, a receiver 116 in communication with the processor 115, a transmitter 117 in communication with the processor 115, and an antenna 118 in communication with both the receiver 116 and the transmitter 117. The antenna 118 may be a plurality of multiple directional antennas, a plurality of antenna elements forming a phased array antenna, or a single antenna capable of omni-directional transmission.

Likewise, in addition to the components in a typical WTRU, the WTRU 110" includes a processor 125 configured to transmit and receive data packets utilizing a smart antenna, a receiver 126 in communication with the processor 125, a transmitter 127 in communication with the processor 125, and an antenna 128 in communication with both the receiver 126 and the transmitter 127. The antenna 128 may be a plurality of multiple directional antennas, a plurality of antenna elements forming a phased array antenna, or a single antenna capable of omni-directional transmission.

Figure 3:
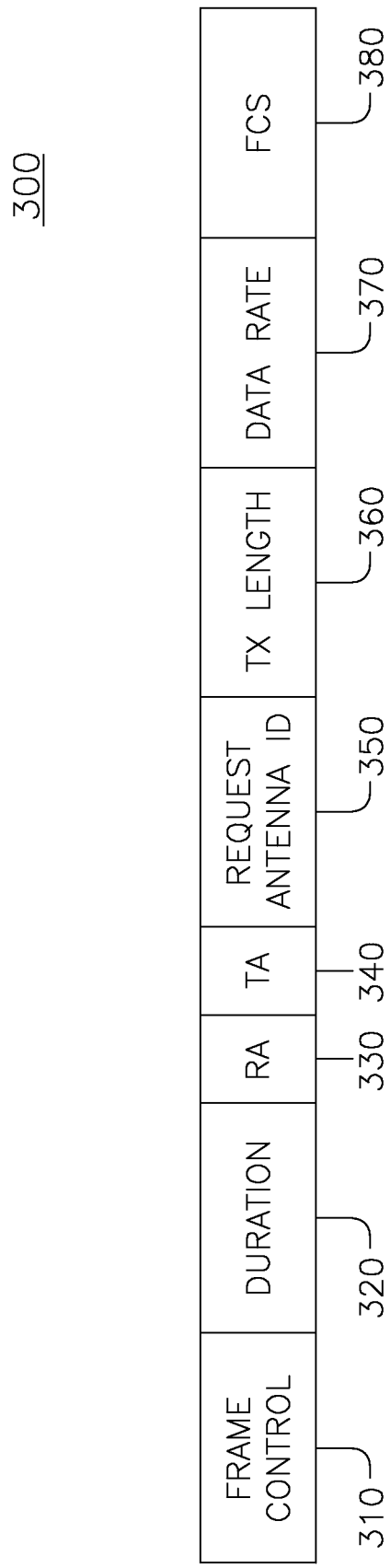
FIG. 3 is a Request for Antenna (RFA) frame in accordance with the present invention.

FIG. 3 is a Request for Antenna (RFA) frame 300 in accordance with the present invention. The RFA frame 300 includes a Frame Control field 310, a Duration field 320, a Receiver Address (RA) field 330, a Transmitter Address (TA) field 340, a Request Antenna Identification (ID) field 350, a Transmission (TX) length field 360, a Data Rate field 370, and a Frame Checksequence (FCS) field 380. The RFA frame 300 may be either a control frame or a management frame.

The Frame Control field 310, the RA field 330, the TA field 340, and FCS field 380 are found in typical medium access control (MAC) frames. Generally, the Frame Control field 310, which generally identifies the data type, the RA field 330 contains the address of the receiver device, the TA field 340 contains the address of the transmitter device, and the FCS field 380 typically contains transmission error information. The Duration field 320 allows a WTRU to perform an update of a network allocation vector (NAV), to account for the amount of time that each STA requires to transmit its frame.

The TX length field 360 allows a WTRU 110 to communicate to another WTRU 110, such as a STA communicating to an AP, how long the WTRU 110 estimates it will be transmitting in the medium. That is, the TX length field 360 includes data describing the transmission time requirement for all packets, including packet fragments that the WTRU 110 will be transmitting during the time it accesses the transmission medium. Accordingly, the information contained in this field may differ from that in the duration field 320. For example, in the case of a fragmented transmission where a WTRU 110 has three fragments to transmit, the duration field 320 may indicate the duration for which the WTRU 110 will be accessing the medium after the ACK following the second fragment. However, the TX length field 360 would convey the estimated duration that the WTRU 110 will be accessing the medium for transmission until the end of the ACK of the last fragment. Because the transmission times for all fragments are additive and summed in the TX length field 360, this example is applicable for the transmission of multiple packets by an 802.11e enabled WTRU within a Transmission Opportunity (TXOP). This information could also be used by an AP for scheduling purposes, although it should not be used by the AP to update the NAV of the AP.

The data rate field 370 allows a WTRU 110 to communicate the data rate it used when estimating the duration conveyed in the TX length field 360.

The request antenna ID field 350 is utilized by the WTRU 110 to convey to another WTRU which beam or antenna the WTRU 110 perceives will offer the best transmission and reception performance in the AP. Accordingly, a STA WTRU could indicate to an AP WTRU which antenna or beam will maximize the performance of the radio link. The request antenna ID field 350 may include data indicating to another WTRU that the WTRU 110 does not require a specific beam, antenna or pattern for transmission.

Figure 4A:
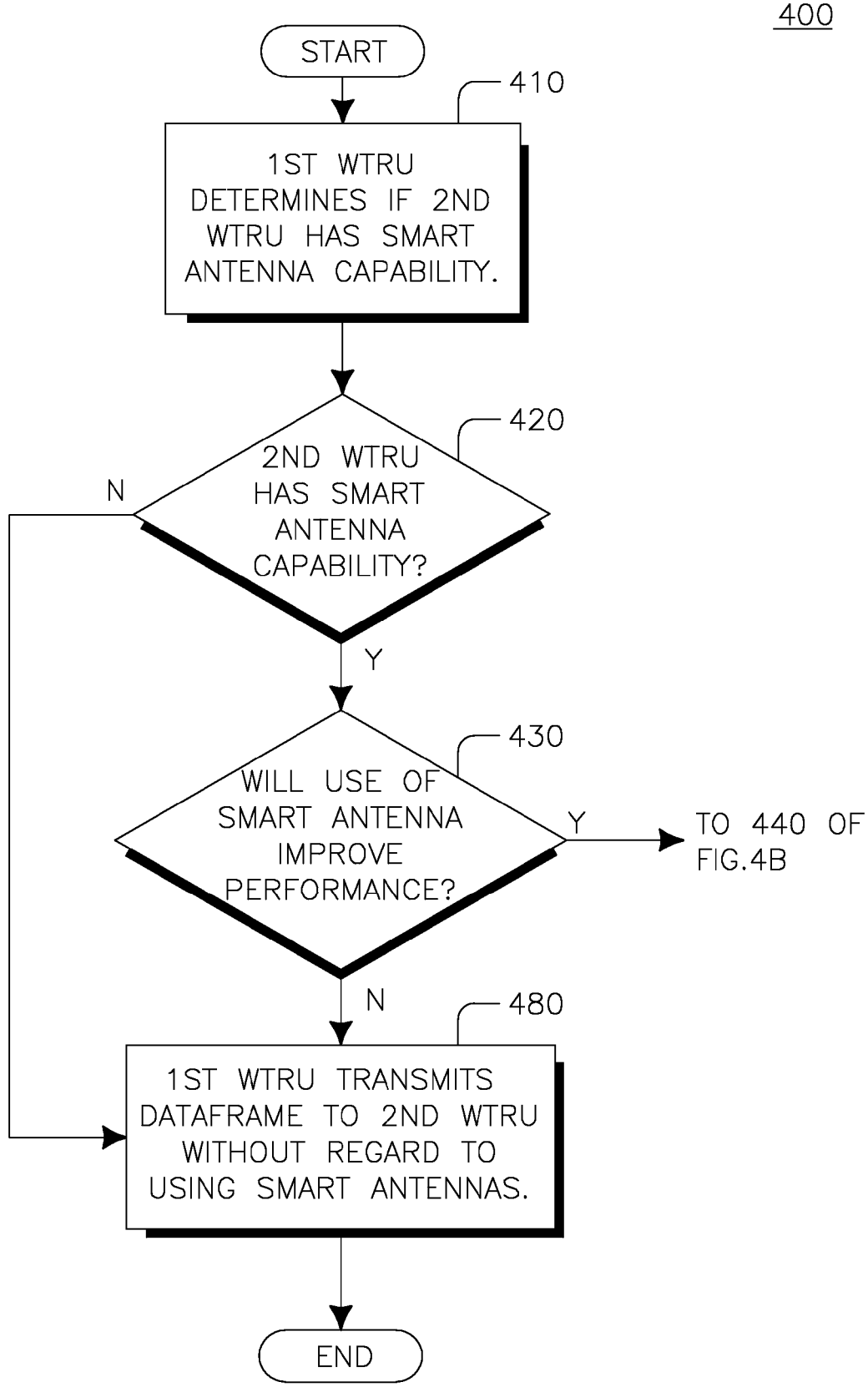
FIGS. 4A and 4B show a flow diagram of a method of transmitting and receiving data in the wireless communication system of FIG. 1, in accordance with the present invention.
Figure 4B:
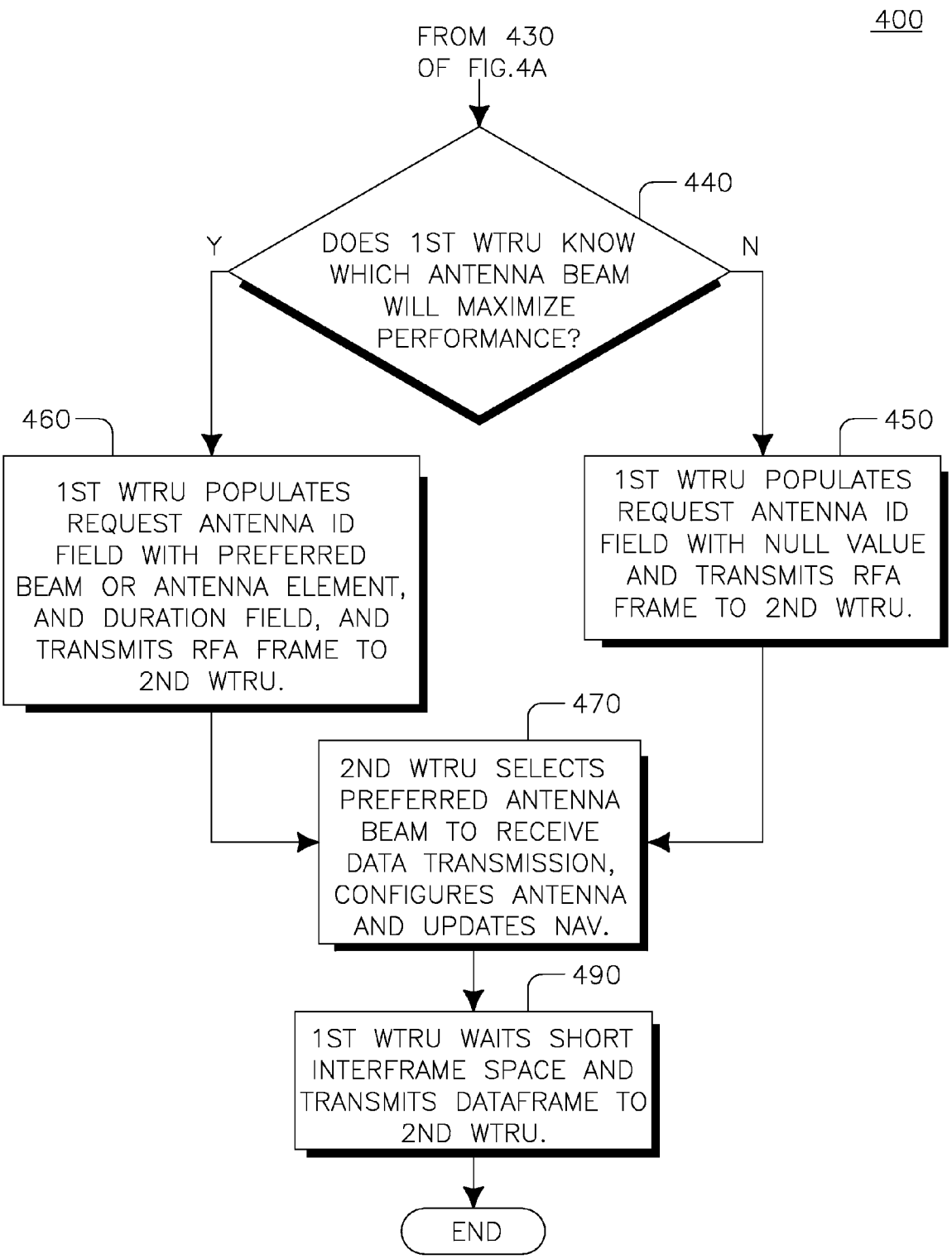

FIGS. 4A and 4B show a flow diagram of a method of transmitting and receiving data 400 by the WTRUs 110' and 110" in the wireless communication system 100, in accordance with the present invention. The WTRUs 110' and 110" may also referred to as the first WTRU and second WTRU, respectively.

Once the first WTRU 110' accesses the wireless communication system 100, it determines whether the second WTRU 110" is equipped with smart antennas (step 410). The first WTRU 110' may accomplish this in a variety of ways. For example, the first WTRU 110' may obtain the information during the association period or by queries, beacons, probe responses, or other signals sent to, and received from, the second WTRU 110".

If the second WTRU 110" does not have smart antenna capabilities (step 420), then the first WTRU 110' transmits its data in a dataframe to the second WTRU 110" without regard to using smart antennas (step 480).

If the second WTRU 110" has smart antenna capability (step 420), then the first WTRU 110' determines whether or not the use of smart antennas would improve transmission performance (step 430). For example, the first WTRU 110' may receive data packets from the second WTRU 110", along with beacons containing specific antenna IDs. In this case, the first WTRU 110' may analyze the power at which the packets were received and associate that power to the antenna ID from which they were transmitted. From this analysis, the first WTRU 110' can determine whether or not packets sent from any particular antenna would yield a better performance than those transmitted from any other antenna. For example, if the packets transmitted from a particular antenna yield better performance than other antennas, then the use of smart antennas would be worthwhile. Likewise, the signal to noise ratios, signal to interference ratios and error rates can be compared between antennas. If no particular antenna yields better performance than any other, the use of smart antennas might not be worthwhile.

If the use of smart antennas would not improve performance in step 430, then the first WTRU 110' transmits its data in a dataframe to the second WTRU 110" without regard to using smart antennas (step 480). The first WTRU 110' may also populate the Request Antenna ID field 350 with a value to indicate to the second WTRU 110" that the first WTRU 110' does not require any specific beam, pattern or antenna be used for transmission and reception. The first WTRU 110' also populates the TA field 340 with its own identifier (which may be its MAC address), the RA field 330 with the identifier of the second WTRU 110" (which may be the MAC address of the second WTRU 110"), and the duration field 320 with the expected transmission time.

If the first WTRU 110' determines that the use of smart antennas will improve performance (step 430), but does not know which antenna beam will maximize performance (step 440), then the first WTRU 110' populates the Request Antenna ID field 350 with a NULL reserved field value to indicate to the second WTRU 110" that the first WTRU 110' is not aware of which antenna beam will maximize performance, and transmits the RFA frame 300 to the second WTRU 110" (step 450).

If the first WTRU 110' determines that the use of smart antennas will improve performance (step 430), and does know which antenna beam will maximize performance (step 440), then the first WTRU 110' populates the TA field 340 with its own identifier (which may be its MAC address), the RA field 330 with the identifier of the second WTRU 110" (which may be the MAC address of the second WTRU 110"), the Request Antenna ID field 350 with the preferred antenna beam for transmission, and the duration field 320 with the expected transmission time taking into account the transmission of the RFA frame 300, dataframe, ACKs, and inter-frame spaces. The first WTRU 110' then transmits the RFA frame 300 to the second WTRU 110" (step 460).

The second WTRU 110" receives the RFA frame 300 from the first WTRU 110'. The second WTRU 110" determines from the RA field 330 that it is the intended receiver, that the first WTRU 110' transmitted the RFA frame 300 by its identifier in the TA field 340, and determines from the Request Antenna ID field 350 what antenna beam, if any, the first WTRU 110' prefers to use for transmission. The second WTRU 110" then determines a preferred antenna beam upon which to receive the data transmission from the first WTRU 110', configures its antenna 128 for reception accordingly, and updates its NAV in accordance with the value in the duration field 320 of the RFA frame 300 (step 470).

One way the second WTRU 110" may determine a preferred antenna beam is from a previous beam-scanning procedure performed. This may be particularly useful if the Request Antenna ID field 350 is populated with a NULL value or a value indicated no preferred antenna beam.

Alternatively, the second WTRU 110" may decide to utilize the antenna beam requested by the first WTRU 110' in the Request Antenna ID field 350 of the RFA frame 300. For example, the second WTRU 110" may utilize the antenna beam requested by the first WTRU 110' because the first WTRU 110' may be in a better position to determine which antenna beam will maximize performance, such as when the first WTRU 110' has been in motion or has not sent any packets for a significant amount of time.

In step 490, the first WTRU 110' waits a short interframe space and then transmits its data.

By allowing the second WTRU 110" to know which WTRU is transmitting data prior to the actual data transmission, the wireless communication system 100 takes advantage of utilizing the smart antenna of the second WTRU 110" without any modification to the Physical Layer Convergence Procedure (PLCP), or any other layers. The utilization of RTS/CTS handshaking is also bypassed.

The features of the above embodiments may be implemented in a variety of manners, such as in an application running on a WTRU. For example, the processors 115 and 125 of the first WTRU 110' and the second WTRU 110" respectively, may be configured to perform any of the steps described in method 400 and transmit frames and data using their respective transmitters, receivers and antennas. The features may also be incorporated into an integrated circuit (IC) or be configured in a circuit comprising a multitude of interconnecting components.

The above embodiments are applicable to radio resource management (RRM) and radio resource control (RRC), at the data link layer and may also be implemented as software or in a MAC chipset.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method, implemented by a first wireless transmit/receive unit (WTRU), for maximizing the performance of a radio link between the first WTRU and a second WTRU, the method comprising:
   the first WTRU receiving signals containing specific antenna IDs from the second WTRU;
   the first WTRU determining that the second WTRU is equipped with smart antennas based on the received signals;
   the first WTRU determining whether the use of smart antennas would improve transmission performance based on parameters associated with the received signal;
   on a condition that the first WTRU determines the use of smart antennas would not improve transmission performance:
      the first WTRU configuring a Request Antenna ID field of a Request for Antenna (RFA) frame with a value indicating that the first WTRU does not require any specific antenna to be used for transmission;
      the first WTRU transmitting the RFA frame to the second WTRU; and
      the first WTRU transmitting a data frame to the second WTRU without the use of smart antennas;
   on a condition that the first WTRU determines the use of smart antennas would improve transmission performance:
      the first WTRU determining which antenna beam will maximize performance;
         on a condition that the first WTRU does not determine which antenna beam will maximize performance:
            the first WTRU configuring the Request Antenna ID field of the RFA frame with a null reserved field value;
            the first WTRU transmitting the RFA frame to the second WTRU; and
            the first WTRU transmitting a data frame to the second WTRU;
         on a condition that the first WTRU does determine which antenna beam will maximize performance:
            the first WTRU configuring the Request Antenna ID field of the RFA frame with a value corresponding to a preferred antenna beam for transmission;
            the first WTRU transmitting the RFA frame to the second WTRU; and
            the first WTRU transmitting a data frame to the second WTRU, using the preferred antenna beam.

2. The method of claim 1 wherein the received signals are queries.

3. The method of claim 1 wherein the received signals are beacons.

4. The method of claim 1 wherein the received signals are probe responses.

5. The method of claim 1 wherein the parameters are power at which the packets were received, signal to noise ratios, signal to interference ratios and/or error rates.

6. The method of claim 1 wherein the RFA frame further comprises a frame control field, a duration field, a receiver address (RA) field, a transmitter address (TA) field, a transmission (TX) length field, a date rate field, and a frame check-sequence (FCS) field.

7. The method of claim 1 wherein the RFA frame is a control frame.

8. The method of claim 1 wherein the RFA frame is a management frame.

* * * * *